(12) United States Patent
Cho et al.

(10) Patent No.: US 11,320,993 B2
(45) Date of Patent: May 3, 2022

(54) POWER MANAGEMENT INTEGRATED CIRCUIT CHIPS, SOLID-STATE DRIVES INCLUDING THE SAME, AND SOLID-STATE DRIVE POWER-MODE CONTROL METHODS

(71) Applicant: Samsung Electronics Co., Ltd., Suwon-si (KR)

(72) Inventors: Byung Yun Cho, Suwon-si (KR); Su Il Jin, Suwon-si (KR); Young Keun Oh, Suwon-si (KR); Kwan Bin Yim, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/562,962

(22) Filed: Sep. 6, 2019

(65) Prior Publication Data

US 2020/0210079 A1 Jul. 2, 2020

(30) Foreign Application Priority Data

Dec. 27, 2018 (KR) .................. 10-2018-0170076

(51) Int. Cl.
*G06F 3/06* (2006.01)
*G06F 1/3234* (2019.01)

(52) U.S. Cl.
CPC .......... *G06F 3/0625* (2013.01); *G06F 1/3275* (2013.01); *G06F 3/0604* (2013.01)

(58) Field of Classification Search
CPC ..................................................... G06F 1/3268
See application file for complete search history.

(56) References Cited

U.S. PATENT DOCUMENTS

| | | | |
|---|---|---|---|
| 7,613,937 B2 * | 11/2009 | Boyum | G06F 1/26 713/1 |
| 9,116,694 B2 | 8/2015 | Ooi | |
| 9,710,041 B2 | 7/2017 | Gendler et al. | |
| 2011/0296222 A1 | 12/2011 | Tan et al. | |
| 2016/0231797 A1 * | 8/2016 | Meir | G06F 1/3287 |
| 2016/0231958 A1 | 8/2016 | Chin et al. | |
| 2017/0123703 A1 * | 5/2017 | Akers | G06F 3/0625 |
| 2017/0277446 A1 * | 9/2017 | Cheong | G06F 1/3268 |
| 2017/0371574 A1 * | 12/2017 | Springberg | G06F 3/0688 |
| 2019/0278363 A1 * | 9/2019 | Rowley | G11C 7/22 |
| 2019/0332165 A1 * | 10/2019 | Stenfort | G06F 1/3287 |

* cited by examiner

*Primary Examiner* — Edward J Dudek, Jr.
(74) *Attorney, Agent, or Firm* — Harness, Dickey & Pierce, P.L.C.

(57) ABSTRACT

A solid-state drive (SSD) power-mode control method that includes storing, in an active register, active mode control data used for switching the SSD from a low power mode to an active mode, storing, in a standby register, low power mode control data used for switching the SSD from the active mode to the low power mode, and controlling power supplied to the SSD in accordance with the low power mode control data or the active mode control data in response to the SSD switching (i) from the active mode to the low power mode or (ii) from the low power mode to the active mode.

20 Claims, 10 Drawing Sheets

POWER MANAGEMENT INTEGRATED CIRCUIT CHIPS, SOLID-STATE DRIVES INCLUDING THE SAME, AND SOLID-STATE DRIVE POWER-MODE CONTROL METHODS

CROSS-REFERENCE TO RELATED APPLICATION(S)

This application claims benefit of priority under 35 U.S.C. § 119 to Korean Patent Application No. 10-2018-0170076 filed on Dec. 27, 2018 in the Korean Intellectual Property Office, the disclosure of which is incorporated herein by reference in its entirety.

BACKGROUND

1. Field

Some example embodiments relate to power management integrated circuit (PMIC) chips, solid-state drives (SSDs) including the same, and SSD power-mode control methods.

2. Description of Related Art

A hard disk drive, such as a storage device used in computers and the like, enables reading and storing data from and to the hard disk drive by physically spinning a magnetic disk. While conventional magnetic disks spin at high speeds, the processing speeds of semiconductors have outpaced the conventional magnetic disks. Also, as such a magnetic disk spins faster, the noise level and power consumption of the hard disk drive increase.

In view of the foregoing, solid-state drives (SSDs) have been proposed as an alternative to replace hard disk drives. Unlike the magnetic disks of hard disk drives, a typical SSD stores data using semiconductors. Due to such characteristics, a processor is able to read and write data from and to an SSD at higher speeds than hard disk drives. Also, due to having no physically moving parts, an SSD generates no operating noise and consumes less power (e.g., in comparison to the conventional magnetic disks). Due to such characteristics, an SSD, when utilized in a computer, may advantageously serve to prolong the remaining battery time thereof.

SSDs are classified as client SSDs, datacenter SSDs, server SSDs, etc. Among these classifications, only datacenter SSDs and server SSDs have a back-up function that is effective even in the event of a sudden power supply outage. Laptop computers, desktop computers, and the like, include operating modes such as a low power mode as well as an active mode, to further extend their battery remaining times. However, during a process of switching between the active mode and the low power mode in client SSDs utilized in such laptop computers and the like, data backup as well as transmission of control signals should be performed in an appropriate order with appropriate timing, the control signals supplying and cutting power supply to components constituting the SSD, such as a controller, a dynamic random-access memory (DRAM), a PMIC, and/or a NAND flash memory.

SUMMARY

Some example embodiments provide a SSD power-mode control method that includes storing, in an active register, active mode control data used for switching the SSD from a low power mode to an active mode, storing, in a standby register, low power mode control data used for switching the SSD from the active mode to the low power mode, and controlling power supplied to the SSD in accordance with the low power mode control data or the active mode control data in response to the SSD switching (i) from the active mode to the low power mode or (ii) from the low power mode to the active mode.

Some example embodiments provide a PMIC chip including a plurality of channels, an active register configured to store active mode control data used for switching a SSD from a low power mode to an active mode, a standby register configured to store low power mode control data used for switching the SSD from the active mode to the low power mode, and processing circuitry configured to output a plurality of power control signals for controlling power of the SSD via the plurality of channels based on the active mode control data or the low power mode control data.

Some example embodiments provide a SSD including a controller, a volatile memory configured to store operating data, a non-volatile memory configured to, receive the operating data from the volatile memory, and store the operating data, and a power management integrated circuit including an active register and a standby register, the active register configured to store active mode control data used for switching the SSD from a low power mode to an active mode, the standby register configured to store low power mode control data used for switching the SSD from the low power mode to the active mode.

BRIEF DESCRIPTION OF THE DRAWINGS

The above and other aspects, features, and advantages of some example embodiments of the present disclosure will be more clearly understood from the following detailed description, taken in conjunction with the accompanying drawings, in which.

DETAILED DESCRIPTION

Figure 1:
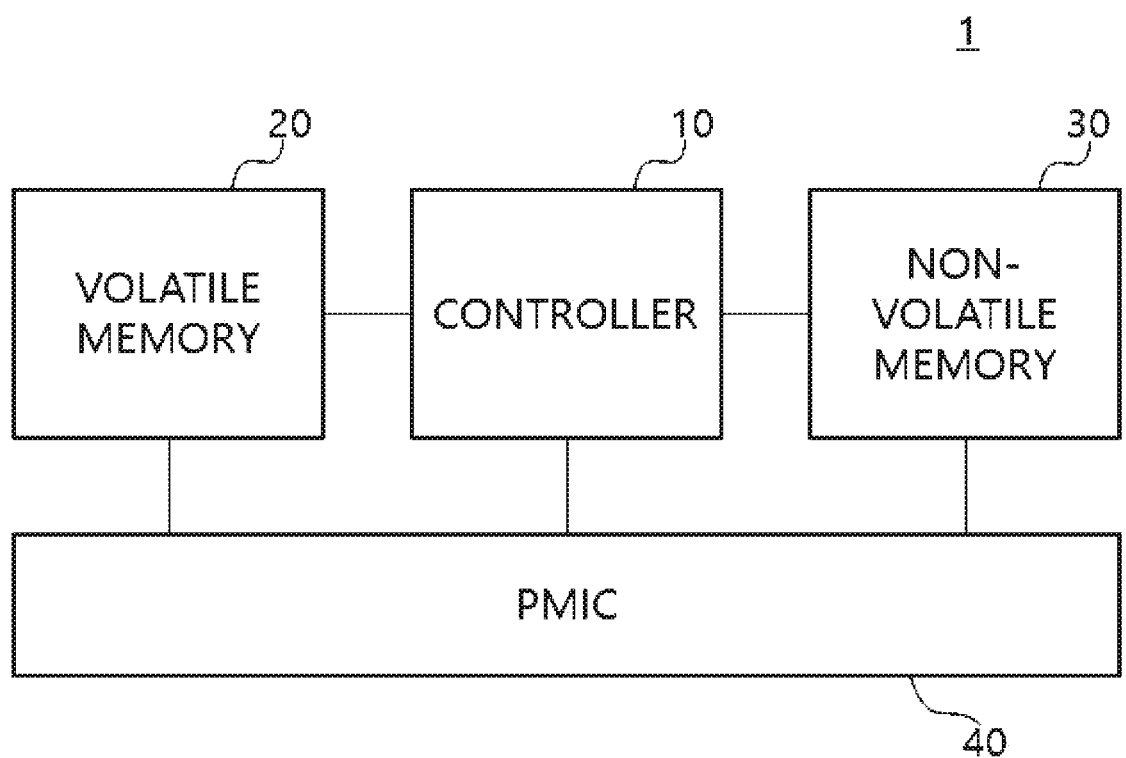
FIG. 1 is a view illustrating an SSD according to some example embodiments.

Hereinafter, some example embodiments will be described with reference to the accompanying drawings.

Advantages and features of some example embodiments, and methods for achieving such advantages and features will become apparent from the following description and claims. It should be understood that the description and some example embodiments disclosed hereinbelow are intended for purposes of illustration only and not intended to limit the scope of some example embodiments. Reference will now be made in detail to some example embodiments, examples of which are illustrated in the accompanying drawings, wherein like reference numerals refer to the like elements throughout.

FIG. 1 is a view illustrating an SSD according to some example embodiments.

Referring to FIG. 1, an SSD 1 may include a controller 10, a volatile memory 20, a non-volatile memory 30, and a power management integrated circuit 40.

The controller 10 may control the overall operation of the SSD 1. For example, the controller 10 may control the volatile memory 20 and the non-volatile memory 30 to read or program data in response to a request of a host. The controller 10 may include a processor such as a central processing unit (CPU).

The volatile memory 20 may be an operation memory, and may store data necessary for driving the SSD 1. In addition, the volatile memory 20 is a buffer memory, and may store data to be programmed in the non-volatile memory 30 or data to be read from the non-volatile memory 30. The volatile memory 20 may include a static random access memory (SRAM), a dynamic random access memory (DRAM), or the like.

The non-volatile memory 30 may store data accessed by the host. The non-volatile memory 30 may include a NAND flash memory, a NOR flash memory, a flash memory having a hybrid structure in which two or more kinds of memories are mixed, or the like.

The power management integrated circuit 40 may control power supplied to components of the SSD 1 to drive the SSD 1. In an embodiment, the power management integrated circuit 40 may differently control power supplied to components of the SSD 1 in accordance with an operation mode of the SSD 1. For example, when the SSD 1 operates in an active mode, the power management integrated circuit 40 may supply power to all the components of the SSD 1. When the SSD 1 operates in a low power mode, the power management integrated circuit 40 may supply power to a portion of components of the SSD 1. In FIG. 1, the power management integrated circuit 40 may be implemented separately from the controller 10, but is merely an example, and the power management integrated circuit 40 may be implemented integrally with the controller 10.

Figure 2:
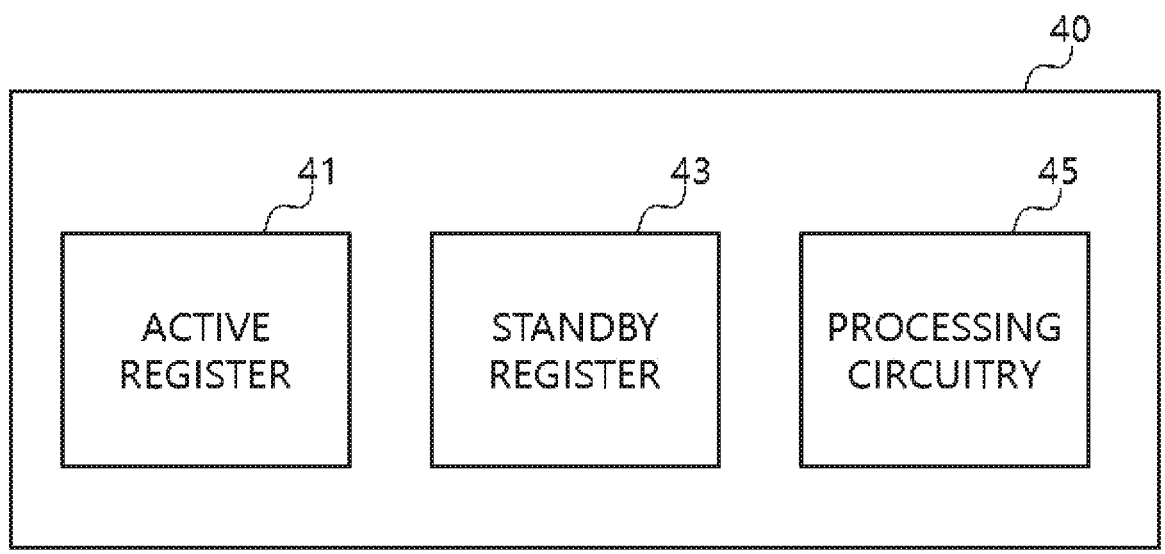
FIG. 2 is a view illustrating a configuration of a power management integrated circuit according to some example embodiments.

FIG. 2 is a view illustrating a configuration of a power management integrated circuit according to some example embodiments.

Referring to FIG. 2, a power management integrated circuit 40 may include an active register 41, a standby register 43, and processing circuitry 45.

The active register 41 and the standby register 43 may store a plurality of control data used to control an operation of the power management integrated circuit 40. For example, the active register 41 may be configured to store active mode control data used for switching an SSD from a low power mode to an active mode, and the standby register 43 may be configured to store low power mode control data used for switching the SSD from the active mode to the low power mode. In an embodiment, the active mode control data and the low power mode control data may include data for supplying or cutting power to each of the components of the SSD, and data for controlling a level of the power supplied to each of the components of the SSD.

The power management integrated circuit 40 may generate a power control signal for controlling power of each of the components of the SSD by using the active mode control data stored in the active register 41 or the low power mode control data stored in the standby register 43. The power management integrated circuit 40 may output the generated power control signal to each of the components of the SSD through a plurality of channels CH1 to CHN. Each of the components of the SSD may be turned on/off based on a power control signal input through at least one channel among the plurality of channels CH1 to CHN.

Hereinafter, the operation method of the power management integrated circuit 40 will be described in more detail.

Figure 3:
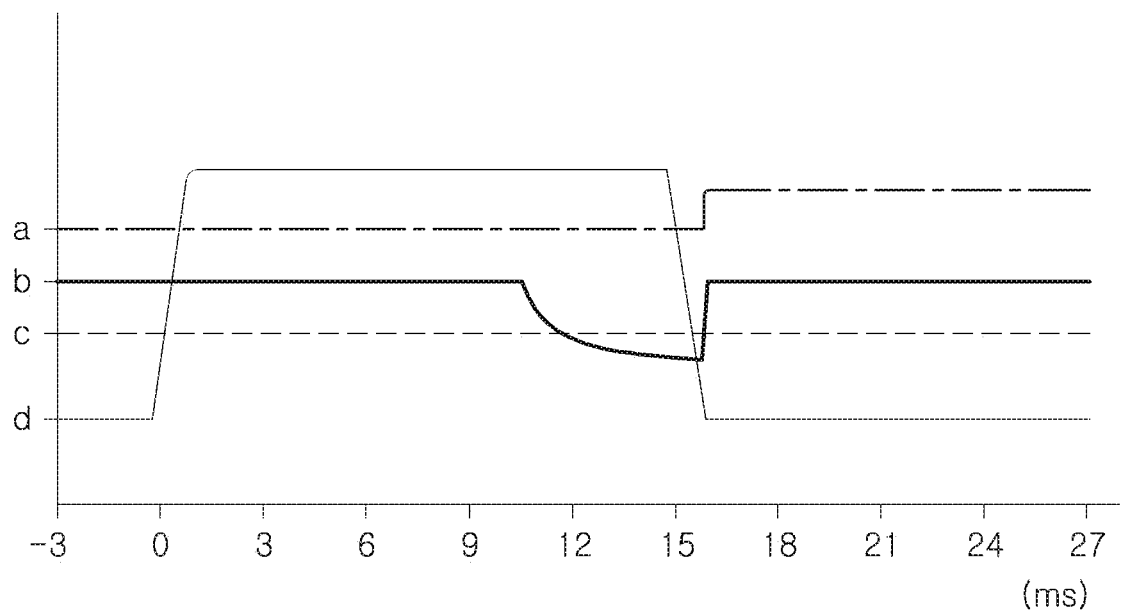
FIG. 3 is a graph illustrating an initialization error that may occur in a non-volatile memory unit after entering a reduced power mode.
Figure 4:
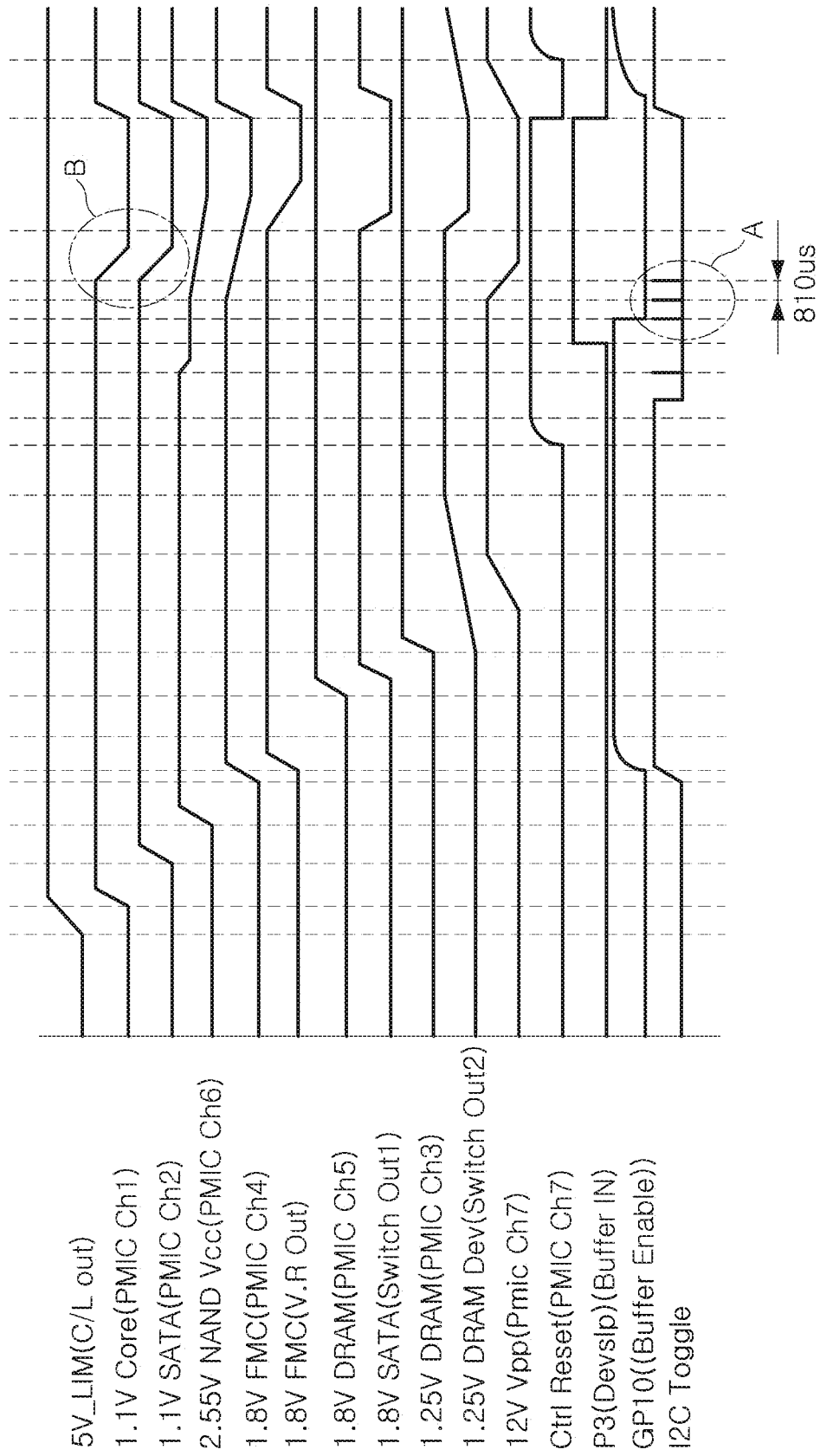
FIG. 4 is a timing diagram for controlling the power mode of a solid-state drive (SSD) externally through I2C communications.

FIG. 3 is a graph illustrating initialization errors that may occur in a non-volatile memory unit after entering a low power mode, and FIG. 4 is a timing diagram for controlling the power mode of a SSD externally through I2C communications. In FIG. 3, waveform a represents an operating voltage of a non-volatile memory, waveform b represents an operating voltage of a controller, waveform c represents an operating voltage of a volatile memory, and waveform d represents an operation mode control signal.

As described above, laptop computers, and the like, utilize various operating modes under different circumstances, such as an active mode and/or a low power mode, in order to prolong battery life (e.g., conserve battery power). When switching from one mode to another, a SSD performs a certain operation to control power in accordance therewith. For example, when a command signal to switch to low power mode (e.g., indicating a switch to low power mode) is received from an external source, the SSD may, after executing backup of data in a controller, and data (e.g., operating data) in a volatile memory (for example, DRAM, etc.), into a non-volatile memory (for example, NAND flash memory, etc.) (e.g., the non-volatile memory may receive and/or store the data of the controller and/or the operating data of the volatile memory), bring the controller and the non-volatile memory into a power off state and keep only the volatile memory in a power on state.

To control power as described above, a power management integrated circuit (PMIC) may output control signals, on the basis of an appropriate order and timing, to individual components included in the SSD (e.g., the controller, the volatile memory and/or the non-volatile memory) through a plurality of channels. In particular, a process of switching from an active mode to a low power mode will be hereinafter referred to as power-off sequence control for the sake of convenience.

The power-off sequence control involves precise execution. If the order or timing of outputting control signals is violated (e.g., incorrect), or an unexpected event such as noise occurs, various malfunctions may result.

For example, if a control signal to exit the low power mode is generated within a short duration (for example, within about 5 ms) after switching from the active mode to the low power mode, non-volatile memory, such as NAND flash memory, becomes charged again before being completely discharged. In such cases, a reset operation of the corresponding non-volatile memory may fail, which may result in memory initialization failure. Referring to the graph of waveform b in FIG. 1, the waveform b, upon transitioning into a low power mode, its voltage level rises within a short period. However, transitioning into an active mode without being completely discharged results in memory initialization failure. In this case, the PMIC may address such errors by operating discharge circuits of the non-volatile memory.

Referring to waveform b of FIG. 3, when the SSD enters a low power mode, and switches from the low power mode to the active mode for a relatively short time in response to falling edge trigger of the operation mode control signal (waveform d), the operating voltage may increase rapidly. In this case, since the non-volatile memory is recharged without being completely discharged, a memory initialization failure error may occur. A power management integrated circuit (PMIC) may address such errors by operating discharge circuits of the non-volatile memory.

Also, in a process of switching the SSD from the active mode to the low power mode, the controller and the non-volatile memory are powered off, and at this point, it takes a determined time until the voltage level of the controller and an input/output voltage level of the non-volatile memory completely drop through natural discharge. In this process, when the input/output voltage level of the non-volatile memory remains greater than or equal to a specific value (for example, about 0.6 V) while the voltage level of the controller is within a determined range (for example, about 0.7-0.8 V), an abnormal control signal may occur, possibly causing an error in the non-volatile memory.

The above-mentioned issue may be addressed through a 2-step control method in which a non-volatile memory input/output voltage is first powered off (e.g., switched off and/or disconnected from power) by a first control signal, and the controller is powered off by a second control signal. Referring to FIG. 4, the lowermost graph in FIG. 4, the inter-integrated circuit (I2C) Toggle signal, is a second-step control signal being received from an external source. Here, it would be desirable to control the power-off timing of the controller appropriately.

However, a method of controlling power of the controller by receiving signals from an external source, as illustrated in FIG. 4, may be unable to control the power-off timing of the controller precisely. It could be confirmed (e.g., determined) that immediately and/or promptly after the second control signal, in which three toggle signals are performed at a uniform time interval in the part marked A in FIG. 4, the voltage of the controller starts to fall as indicated as B in FIG. 4. Furthermore, since a falling slew rate of a voltage level may vary depending on the product type of the SSD, it would also be desirable to control the timing at which the second control signal is applied so as to correspond with the characteristics of each product type.

Figure 5:
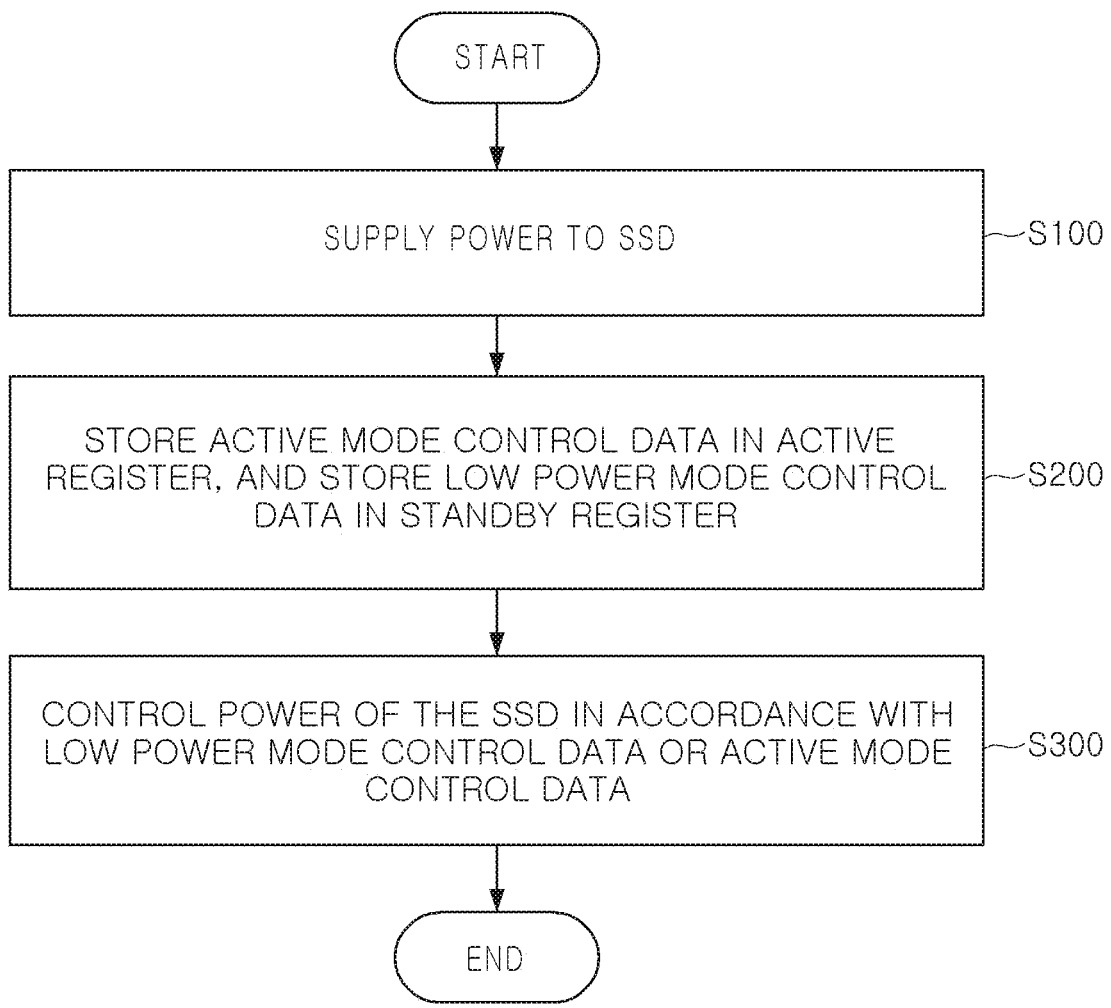
FIG. 5 is a flowchart for a SSD power-mode control method according to some example embodiments.
Figure 6:
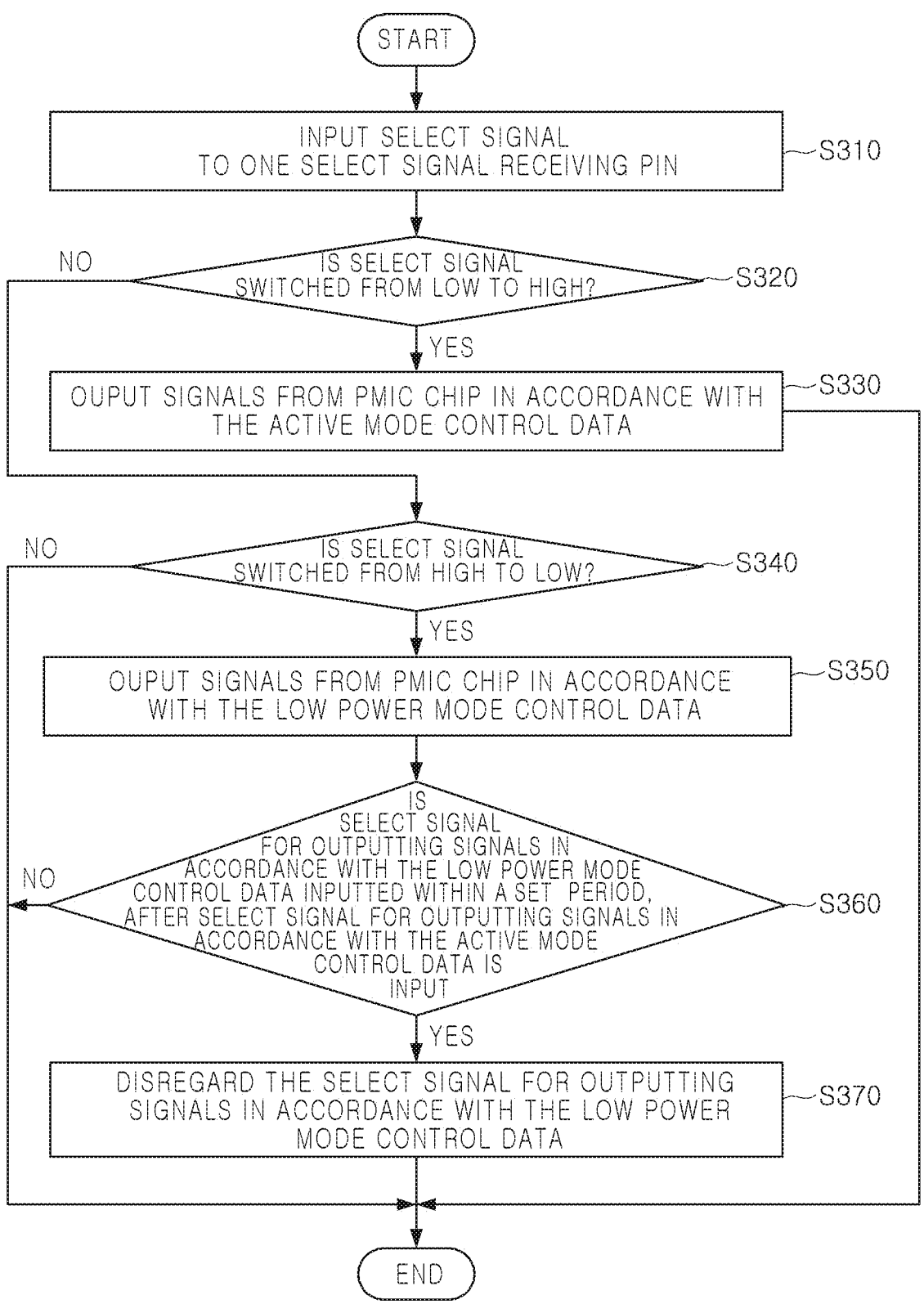
FIG. 6 is a flowchart further detailing S300 of FIG. 5 according to some example embodiments.
Figure 7:
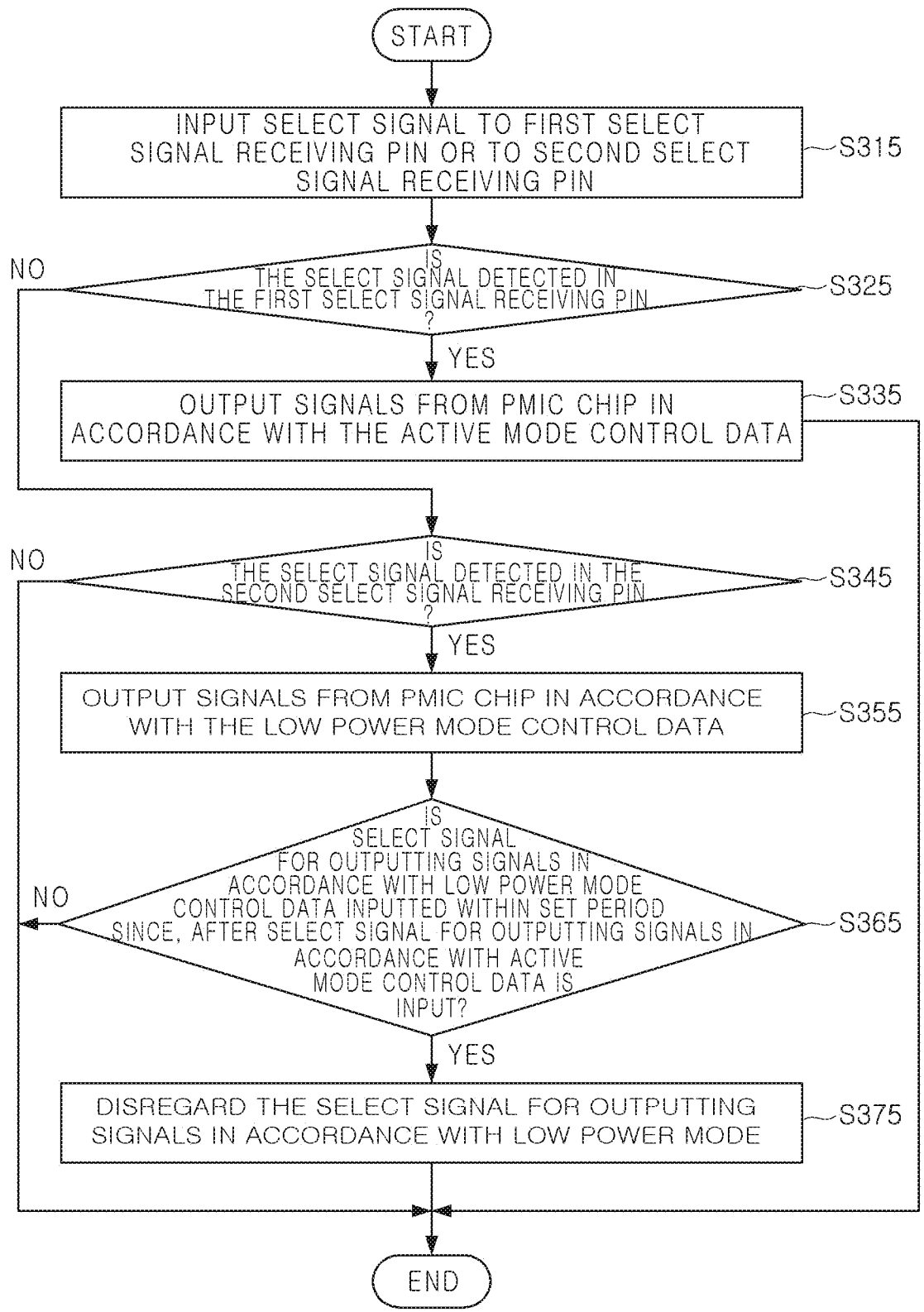
FIG. 7 is a flowchart further detailing S300 of FIG. 5 according to some example embodiments.

FIG. 5 is a flowchart of a SSD power-mode control method according to some example embodiments, FIG. 6 is a flowchart further detailing S300 of FIG. 5 according to some example embodiments, and FIG. 7 is a flowchart further detailing S300 of FIG. 5 according to some example embodiments.

The SSD power-mode control method according to some example embodiments may include supplying power to a SSD (S100), storing, by a power management integrated circuit (PMIC), active mode control data and low power mode control data in a memory (e.g., separately in an active register and a standby register, respectively) (S200), and controlling power of the SSD (S300). According to some example embodiments, the memory may be one or more of Random Access Memory (RAM), flash memory, Read Only Memory (ROM), Electrically Programmable ROM (EPROM), Electrically Erasable Programmable ROM (EEPROM), one or more registers, a hard disk, a removable disk, a CD ROM, etc.

In the SSD power-mode control method according to some example embodiments, the setting and storing, by the PMIC, active mode control data and low power mode control data separately in an active register and a standby register (S200), respectively (e.g., internal operation registers of the PMIC), may be performed during initialization of the PMIC after the supplying power to the SSD (S100).

In S200, the active mode control data used for switching the SSD from the low power mode to the active mode may be stored in the active register. The active register, for example, may be as presented in Table 1.

TABLE 1

| Register Address | Register Name | Description of Register | Type of active mode control data |
|---|---|---|---|
| 0x00 | OUT1_REG | Voltage setting for Buck Channel 1 | Voltage level control data |
| 0x01 | OUT2_REG | Voltage setting for Buck Channel 2 | |
| 0x02 | OUT3_REG | Voltage setting for Buck Channel 3 | |
| 0x03 | OUT4_REG | Voltage setting for Buck Channel 4 | |
| 0x04 | OUT5_REG | Voltage setting for Buck Channel 5 | |
| 0x05 | OUT6_REG | Voltage setting for Buck Channel 6 | |
| 0x06 | OUT7_REG | Voltage setting for Buck Channel 7 | |
| 0x07 | OUT8_REG | Voltage setting for Booster Channel 8 | |
| 0x08 | Power_Enable_REG | Each power channel enable/disable | Enable control data |
| 0x09 | Etc_Enable_REG | Etc Block enable/disable | |
| 0x0A | Discharge_Enable_REG | Each power channel Discharge enable/disable | Discharge control data |
| 0x0B | Discharge_R_REG | Discharge resistance of each power channel select | |
| 0x0C | Mode_CTRL | Auto pulse-width modulation (PWM)/pulse-frequency modulation (PFM) Mode or forced PWM mode | Pulse control data |

TABLE 1-continued

| Register Address | Register Name | Description of Register | Type of active mode control data |
|---|---|---|---|
| 0x0D | PG_CHx | PG_All Monitor/CTRL Register | — |
| 0x0E | OVP_CHx | Each power channel over voltage protection (OVP) monitor | |
| 0x11 | OCP_CHx | Each power channel over current protection (OCP) monitor | |
| 0x12 | Inform_REG | Manufacturer, Version, etc. | |
| 0x13 | Wafer No. | Wafer No. | |
| 0x14 | Wafer X -coordinate | Wafer X -coordinate | |
| 0x15 | Wafer Y -coordinate | Wafer Y -coordinate | |
| 0x16 | Lot No. | Lot No. | |

Also, in S200, the low power mode control data used for switching the SSD from the active mode to the low power mode may be stored in the standby register. The standby register, for example, may be as presented in Table 2.

TABLE 2

| Register Address | Register Name | Description of Register | Low power mode control Data type |
|---|---|---|---|
| 0x19 | Standby_REG | Standby mode control | — |
| 0x20 | PENABLE_STANDBY_REG | Each Power channel enable/disable at Standby | Enable control data |
| 0x21 | ENABLE_STANDBY_REG | Etc Block enable/disable, L/S off Delay at Standby | |
| 0x22 | OUT1_STANDBY_REG | Voltage setting for Buck Channel 1 at Standby | Voltage level control data |
| 0x23 | OUT2_STANDBY_REG | Voltage setting for Buck Channel 2 at Standby | |
| 0x24 | OUT3_STANDBY_REG | Voltage setting for Buck Channel 3 at Standby | |
| 0x25 | OUT4_STANDBY_REG | Voltage setting for Buck Channel 4 at Standby | |
| 0x26 | OUT5_STANDBY_REG | Voltage setting for Buck Channel 5 at Standby | |
| 0x27 | OUT6_STANDBY_REG | Voltage setting for Buck Channel 6 at Standby | |
| 0x28 | OUT7_STANDBY_REG | Voltage setting for Buck Channel 7 at Standby | |
| 0x29 | Mode_STANDBY_REG | Auto/forced PWM mode at Standby | Pulse control data |
| 0x2A | Delay(1)_STANDBY_REG | Ch1/Ch2/Ch3/Ch4 Off Delay at Standby | Delay control data |
| 0x2B | Delay(2)_STANDBY_REG | Ch5/Ch6/Ch7/Ch8 Off Delay at Standby | |
| 0x2C | Deep_STANDBY_REG | Each Channel enter to Deep Sleep Mode at Standby | — |

As described above, the active register and the standby register may be stored separately as internal operation registers of the PMIC chip included in the SSD. Although eight channels are being used in some example embodiments proposed in Table 1 and Table 2, the number of channels being applied may be appropriately varied according to the specifications of a control target.

The active mode control data and the low power mode control data each may include at least one among enable control data, discharge control data, pulse control data, and/or voltage level control data. In particular, the low power mode control data may further include delay control data.

The enable control data may be used for controlling ON/OFF switching of respective channels (e.g., at least one channel of a plurality of channels of the PMIC), and/or control a control target to be in an on or off state by controlling outputs of channels being supplied to control targets, such as the controller, the volatile memory, and/or the non-volatile memory, which may be controlled through the PMIC.

The discharge control data may be used to determine whether to operate a discharge circuit for controlling the voltage level dropping rate of a corresponding channel to be faster than a natural discharge rate, once a particular channel has been switched from an on state to an off state to control a control target (e.g., a component of the SSD, such as, the controller, the volatile memory and/or the non-volatile memory). To prepare for the event in which a control signal to exit the low power mode is generated within a short period (for example, within about 5 ms) following switching from the active mode to the low power mode, the PMIC according to some example embodiments may be prepared (e.g., configured) to address such errors by operating discharge circuits of a non-volatile memory. To this end, PMIC chips, SSDs, and SSD power-mode control methods according to some example embodiments may allow the power-off sequence control to progress smoothly by setting discharge control data contained in the active mode control data and/or the low power mode control data.

The pulse control data may be used for controlling the mode of a power pulse being supplied through the channel (e.g., at least one channel of a plurality of channels of the PMIC), for example, for controlling so as to allow one selected from a pulse frequency modulation (PFM) mode and/or a pulse width modulation (PWM) mode, to be outputted through the channel, as desired.

The voltage level control data may be used for dynamically modulating the level of voltage being supplied by respective channels (e.g., at least one channel of a plurality of channels of the PMIC). For example, while a voltage of 1.1 V is being supplied through channel 1, set voltage level control data may be utilized to modulate the level of voltage being supplied through the corresponding channel (e.g., to raise the voltage being supplied to 1.125 V, etc.).

The delay control data may be used to control the timing of outputting control signals being supplied through the channels (e.g., at least one channel of a plurality of channels of the PMIC). Power supply through respective channels, the level of voltage being supplied, waveforms of signals, forced discharge, and/or the like may be determined using the previously described enable control data, discharge control data, pulse control data, voltage level control data, and/or the like, wherein the delay control data may be used to delay the timing of outputting these control signals (e.g., signals in accordance with the enable control data, the discharge control data, the pulse control data, and/or the voltage level control data) by applying set figures (e.g., set delay values). According to some example embodiments, any or all of the enable control data, the discharge control data, the pulse control data, the voltage level control data and/or the delay control data may be conventional data that would be known to a person of ordinary skill in the art.

The delay data may include at least two delay values. For example, if the delay control data includes 2 bits, 00, 01, 10, and 11 may mean 0 us delay, 50 us delay, 200 us delay, and 400 us delay, respectively. Controlling the power of a SSD (S300) may include outputting, at a different timing to different channels in accordance with the at least two delay control data bits, a control signal in accordance with at least one among the enable control data, the discharge control data, the pulse control data, and/or the voltage level control data.

As described above, one or more control signals for supplying and blocking (e.g., disconnecting) power (e.g., power control signals) to components such as DRAM, PMIC, NAND flash memory, and/or the like, may be provided based on appropriate timing during a process of switching between the active mode and the low power mode. Since the falling slew rate of a voltage level may be different, depending on the type of SSD product, an appropriate order and timing of applying the second control signal may be set differently for each product type and in compliance with the characteristics of each product, such that when an event of switching between the active mode and the low power mode transpires, in accordance with the order and supply timing of signals being supplied to respective components, the power-off sequence may be processed collectively in a determined sequence.

To this end, it would be desirable to control the order and timing of outputting signals for respective channels. As shown in Table 2, Delay(1)_STANDBY_REG is a register which sets delay control data for controlling delay times of channel 1 to channel 4, and Delay(2)_STANDBY_REG is a register which sets delay control data for controlling delay times of channel 5 to channel 8.

In operation S300, the PMIC may control the power supplied to the SSD in accordance with the low power mode control data in the case of the SSD switching from the active mode to the low power mode, and control the power supplied to the SSD in accordance with the active mode control data in the case of the SSD switching from the low power mode to the active mode.

Once switching between the active mode and the low power mode is determined according to a usage state of the device in which a client-type SSD is installed (e.g., a computer) or according to other criteria, the PMIC may receive a select signal from a source external to the SSD (e.g., from at least one processor of the computer) so that this mode switching may be reflected in a SSD state. Through the select signal, the PMIC may determine on an output in accordance with the active mode control data or an output in accordance with the low power mode control data.

According to some example embodiments, the select signal may be input to one select signal receiving pin. Referring to FIG. 6, depicting operation S300 in detail according to some example embodiments, when a select signal is input to the one select signal receiving pin (S310), a signal (e.g., one or more power control signals) may be output in accordance with the active mode control data, or in accordance with low power mode control data, depending on whether the select signal is an rising edge or a falling edge.

For example, when the select signal is a rising edge switching from Low to High (e.g., logic Low to logic High) (Yes in S320), the PMIC may output the signal (e.g., one or more power control signals) in accordance with the active mode control data set and/or stored in S200) for use in switching from the low power mode to the active mode (S330). For example, when the select signal is a rising edge switching from Low to High, the PMIC may determine that the select signal indicates the SDD is switching from the low power mode to the active mode. According to some example embodiments, operation S330 may include generating one or more power control signals (e.g., a plurality of power control signals) in accordance with the active mode control data set, and controlling an amount of power supplied to one or more components of the SSD (e.g., the controller, the non-volatile memory and/or the volatile memory) by outputting the one or more power control signals to the SSD.

If the select signal is a falling edge switching from High to Low (e.g., logic High to logic Low) (Yes in S340), the PMIC may output the signal (e.g., one or more power control signals) in accordance with the low power mode control data set and/or stored in S200) for use in switching from the active mode to the low power mode (S350). For example, when the select signal is a rising edge switching from High to Low, the PMIC may determine that the select signal indicates the SDD is switching from the active mode to the low power mode. According to some example embodiments, operation S350 may include generating one or more power control signals (e.g., a plurality of power control signals) in accordance with the low power mode control data set, and controlling an amount of power supplied to one or more components of the SSD (e.g., the controller, the non-volatile memory and/or the volatile memory) by outputting the one or more power control signals to the SSD.

Also, in the case in which a select signal (e.g., a second select signal) for outputting a signal in accordance with the low power mode control data is input within a determined period after the select signal (e.g., a first select signal) for outputting a signal in accordance with the active mode control data is input (S360), the PMIC may disregard the select signal (e.g., the second select signal) for outputting a signal in accordance with the low power mode control data (S370). This will be described in greater detail in conjunction with FIG. 9. According to some example embodiments, the determined period may be a design parameter determined through empirical study and/or based on the low power mode control data and/or the active mode control data.

According to some example embodiments, the select signal may be input to a first select signal receiving pin or a second select signal receiving pin. Referring to FIG. 7, depicting operation S300 in detail according to some example embodiments, the PMIC may output a signal in accordance with the active mode control data or output a signal in accordance with the low power mode control data depending on whether the select signal is input to the first select signal receiving pin or the second select signal receiving pin.

For example, in the case in which the select signal is detected (e.g., by the PMIC) as being input to the first select signal receiving pin (Yes in S325), the PMIC, for switching from the low power mode to the active mode, may output a signal (e.g., one or more power control signals) in accordance with the active mode control data set and/or stored in S200) (S335). For example, when the select signal is received via the first select signal receiving pin, the PMIC may determine that the select signal indicates the SDD is switching from the low power mode to the active mode. According to some example embodiments, operation S335 may include generating one or more power control signals in accordance with the active mode control data set, and controlling an amount of power supplied to one or more components of the SSD (e.g., the controller, the non-volatile memory and/or the volatile memory) by outputting the one or more power control signals to the SSD.

However, if the select signal is detected as being inputted to the second select signal receiving pin (Yes in S345), the PMIC, for switching from the active mode to the low power mode, may output a signal (e.g., one or more power control signals) in accordance with the low power mode control data set and/or stored in S200) (S355). For example, when the select signal is received via the second select signal receiving pin, the PMIC may determine that the select signal indicates the SDD is switching from the active mode to the low power mode. According to some example embodiments, operation S355 may include generating one or more power control signals in accordance with the low power mode control data set, and controlling an amount of power supplied to one or more components of the SSD (e.g., the controller, the non-volatile memory and/or the volatile memory) by outputting the one or more power control signals to the SSD.

However, if a select signal (e.g., a second select signal) for outputting a signal in accordance with the low power mode control data is input within a determined period (S365) after the select signal (e.g., a first select signal) for outputting a signal in accordance with the active mode control data is input, the PMIC may be configured to disregard the select signal (e.g., the second select signal) for outputting a signal in accordance with low power mode control data (S375). This will be described in greater detail in conjunction with FIG. 9. According to some example embodiments, the determined period may be a design parameter determined through empirical study and/or based on the low power mode control data and/or the active mode control data.

Figure 8:
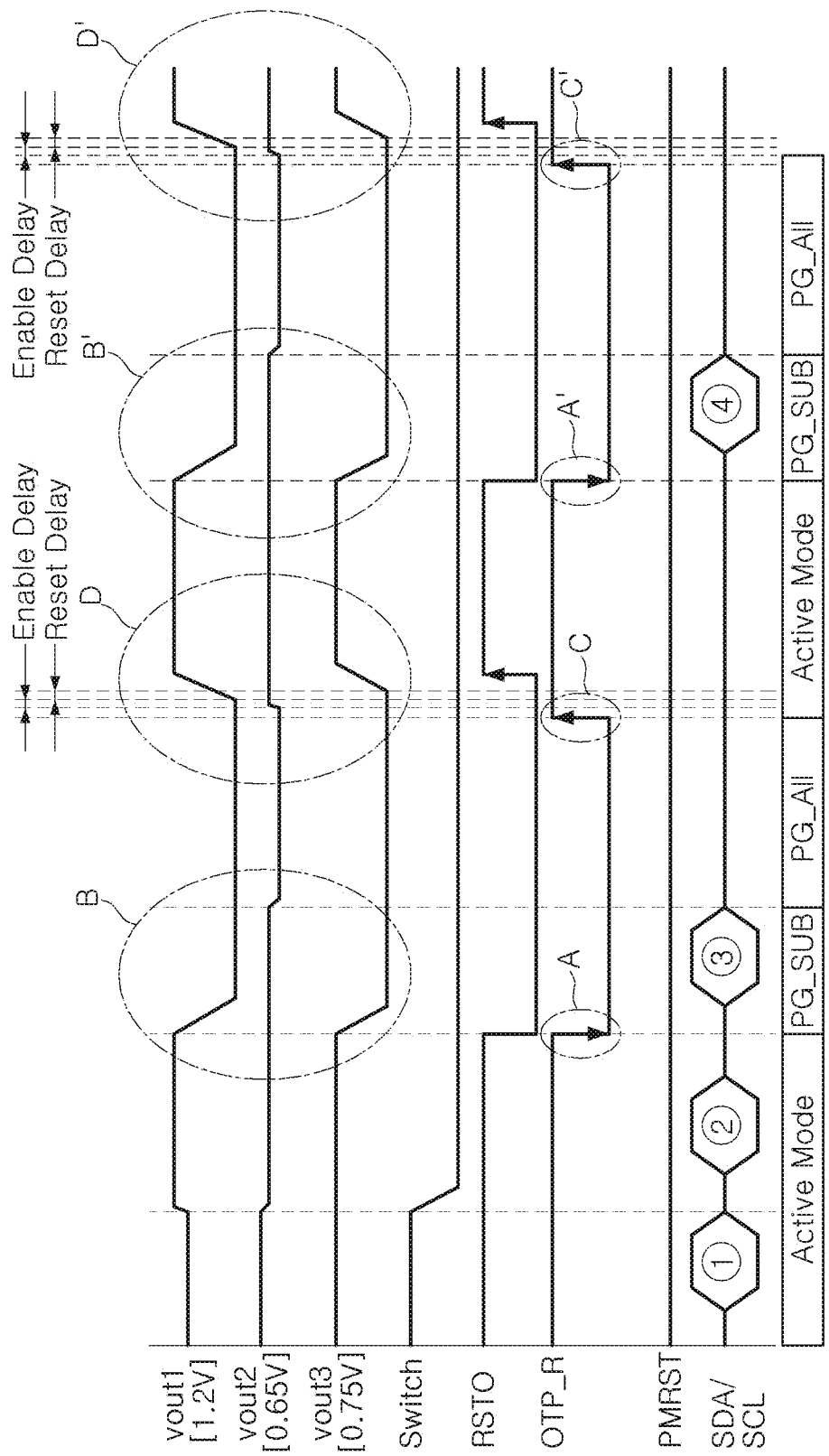
FIG. 8 is a timing diagram for controlling the power mode of a SSD by applying some example embodiments illustrated in FIG. 6.
Figure 9:
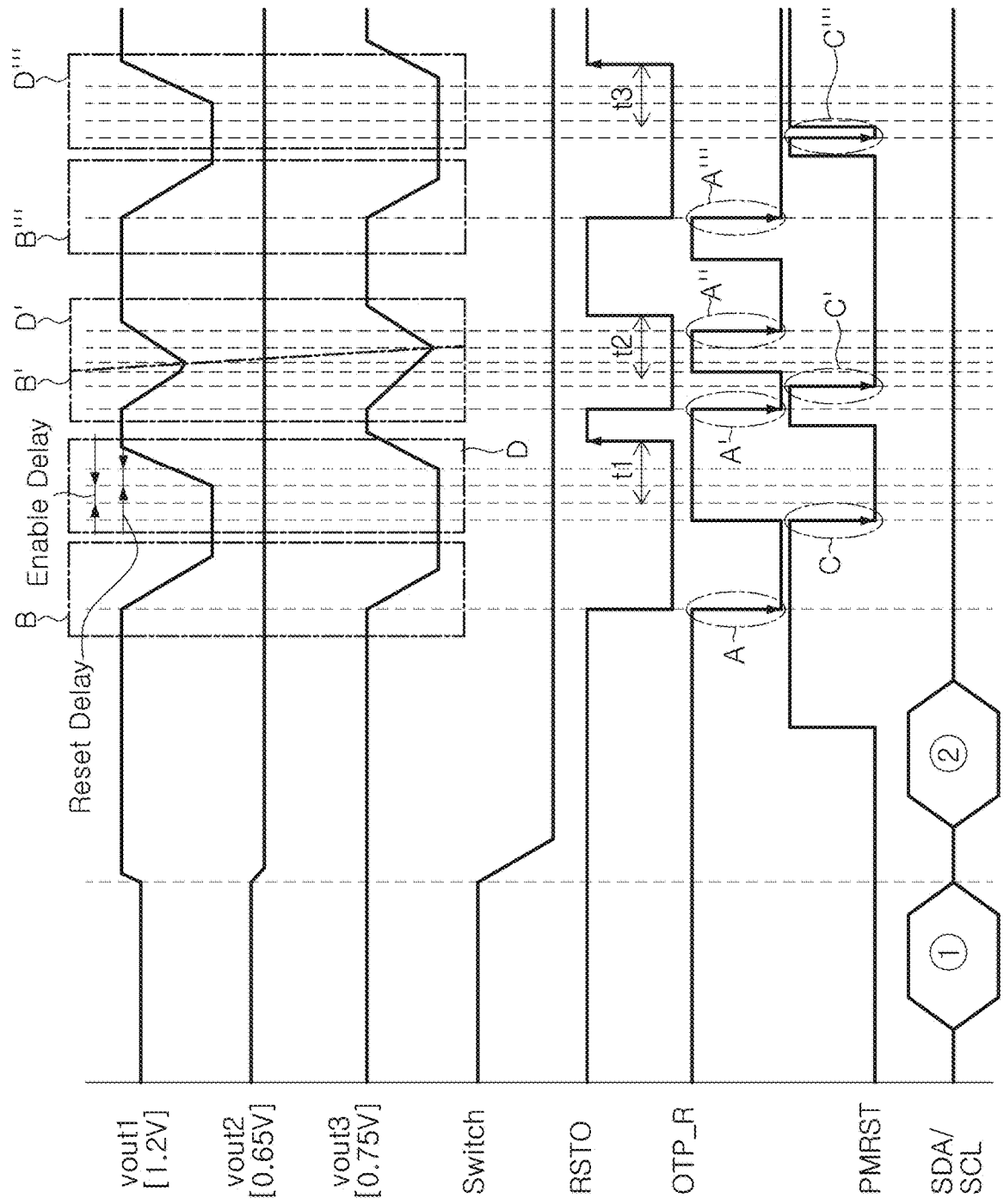
FIG. 9 is a timing diagram for controlling the power mode of a SSD by applying some example embodiments illustrated in FIG. 7.

FIG. 8 is a timing diagram for controlling the power mode of a SSD by applying the methods illustrated in FIG. 6, and FIG. 9 is a timing diagram for controlling the power mode of a SSD by applying the methods illustrated in FIG. 7.

As illustrated in FIG. 8, when select signal OTP_R is input to one select signal receiving pin, the PMIC may control operations and power of (e.g., provide power to) components constituting the SSD, based on an appropriate timing and order by outputting a signal in accordance with the active mode control data or a signal in accordance with the low power mode control data set and/or stored in S200, depending on whether the select signal is a rising edge or a falling edge.

Once a device containing the SSD as a storage device is powered on and the PMIC of the SSD starts to operate, the PMIC may execute, during initialization, operations for setting and/or storing active mode control data (①), and setting and/or storing low power mode control data ② ('Active Mode' period).

Thereafter, as illustrated in the part (e.g., the part of the select signal OTP_R) marked A and/or A', in the case in which select signal OTP_R for switching from High to Low (e.g., logic High to Logic low) is input from a source external to the PMIC, the PMIC, to switch from the active mode to the low power mode, may output a signal in accordance with the low power mode control data set and/or stored in the 'Active Mode' period. Accordingly, power control of components constituting the SSD may be achieved through respective channels of the PMIC.

The part (e.g., the part of the voltage control signals vout1, vout2 and vout3) marked B and/or B' illustrates changes in signals output from a portion of the channels of the PMIC as a result of performing the above-described power control. For example, in vout1 and vout3, voltage levels start to fall immediately and/or promptly and fall to a relatively low level, whereas in vout2, the signal may be controlled such that the voltage level starts to fall after a certain delay time and falls to a lesser extent (③, ④) ('PG_SUB' period).

Such timing and/or extent of voltage level drop are determined as a result of being controlled in accordance with the low power mode control data previously set and/or stored in the standby register in the 'Active Mode' period. For example, the delay between the falls in voltage level of vout1 and vout3 and the fall in voltage level of vout2 may be determined based on the delay control data included in the low power mode control data. According to some example embodiments, the voltage control signal vout1 may correspond to the non-volatile memory of the SSD and the voltage control signal vout2 may correspond to the controller of the SSD.

In the 'PG_All' period after the voltage level of vout2 starts to fall, as may be seen from the part (e.g., the part of the select signal OTP_R) marked C and/or C', in the case in which select signal OTP_R for switching from Low to High is input from a source external to the PMIC, the PMIC, to switch from the low power mode to the active mode, may output a signal in accordance with the active mode control data set and/or stored in the active register in the 'Active Mode' period. Accordingly, power control of components constituting the SSD may be achieved through respective channels of the PMIC.

The part (e.g., the part of the voltage control signals vout1, vout2 and vout3) marked D and/or D' illustrates changes in signals output from a portion of the channels of the PMIC as a result of performing the above-described power control. For example, the starting points of voltage rise are being determined in the order of vout3, vout1, and vout2; and the lengths of delays in these signals (enable delay and/or reset delay), the extent of voltage level rise, and/or the like, may be determined (e.g., by the PMIC) as a result of being controlled in accordance with the active mode control data set and/or stored in the active register.

As described above, according to some example embodiments, precise control over signals output through a plurality of channels of the PMIC may be achieved. Here, in the execution of the two-step control previously described, first and second controls are achieved not by the signals provided from a source external to the PMIC (e.g., from at least one processor of a computer including the SSD), such as a I2C Toggle signal, but by storing control data set for each product model in the active register and/or the standby register, and then when mode switching occurs, utilizing the control data set and/or stored in a selected register in accordance with the type of mode switching. Accordingly, the signals outputted through respective channels of the PMIC may be precisely controlled, thereby preventing and/or reducing errors from occurring in a mode switching process.

As illustrated in FIG. 9, the select signal may be input to the first select signal receiving pin (PMRST) and/or the second select signal receiving pin (OTP_R). Depending on whether the select signal is detected (e.g., by the PMIC) in the first select signal receiving pin (PMRST) or in the second select signal receiving pin (OTP_R), the PMIC may output a signal in accordance with the active mode control data or a signal in accordance with the low power mode control data, set and/or stored in S200, to thereby control operations and/or power of components constituting the SSD in accordance with an appropriate order and/or timing. In some example embodiments, the PMIC is described as being responsive to a falling edge of the select signal input to the above two select signal receiving pins, but the PMIC is not limited thereto, and the PMIC may be responsive to a rising edge of the select signal according to some example embodiments.

Once a device including a SSD as a storage device is powered on, and the PMIC of the SSD starts to operate, the PMIC may execute operations for setting and/or storing the active mode control data ①, and/or setting and/or storing the low power mode control data ② during initialization (S200).

Thereafter, as may be seen from the part (e.g., the part of the select signal OTP_R) marked A, A', A" and/or A''', in the case in which the select signal is detected (e.g., by the PMIC) in the second select signal receiving pin (OTP_R), the PMIC, for switching from the active mode to the low power mode, may output a signal in accordance with the low power mode control data set and/or stored in S200. Accordingly, power control of components constituting the SSD is achieved through respective channels of the PMIC, which results in power control performance as illustrated in the part (e.g., the part of the voltage control signals vout1, vout2 and vout3) marked B, B', and/or B'''. Precise control over the starting point of voltage level drop of the signals output from the respective channels, and/or subsequent delay lengths and/or extents of voltage level drop of the respective channels may be achieved. Since this has been previously described in conjunction with FIG. 8 and the description thereof, no further description will be given here.

Thereafter, as may be seen from the part (e.g., the part of the select signal OTP_R) marked C, C', and/or C''', in the case in which the select signal is detected (e.g., by the PMIC) in the first select signal receiving pin (PMRST), the PMIC, for switching from the low power mode to the active mode, may output a signal in accordance with the active mode control data set and/or stored in S200. Accordingly, power control of components constituting the SSD is achieved through respective channels of the PMIC, which results in power control performance as shown in part (e.g., the part of the voltage control signals vout1, vout2 and vout3) marked D, D', and/or D'''. Precise control over the starting point of voltage level rise of the signals outputted from the respective channels, and/or subsequent delay lengths and/or extents of voltage level rise of the respective channels may be achieved.

As may be seen from the part marked A'', when the select signal (e.g., a second select signal) is detected in the second select signal receiving pin OTP_R, but as illustrated in the part marked C', if a point in time at which the select signal (e.g., the second select signal) is detected falls within a determined time since the select signal (e.g., a first select signal) is detected in the first select signal receiving pin PMRST, the select signal marked A" (e.g., the second select signal) may be disregarded (e.g., by the PMIC). That is, since period t2 is smaller than a set period, the period t2 being from a point in time at which the select signal marked C' is input to a point in time at which the select signal marked A" is input, in this case, the PMIC may disregard the select signal A" for outputting a signal in accordance with the low power mode control data. However, since period t1 is not smaller than the set period, the period t1 being from a point in time at which the select signal marked C is input to a point in time at which select signal marked A1 is input, according to the select signal A', the signal in accordance with the low power mode control data may be output (e.g., by the PMIC) to proceed the power-off sequence control. According to some example embodiments, the set period may be a design parameter determined through empirical study and/or based on the low power mode control data and/or the active mode control data.

This indicates that, between switching to the active mode and switching to the low power mode, the switching to the active mode may be given priority. This is to prevent and/or reduce inadvertent switching to the low power mode when unintended by the user (e.g., due to an unexpected noise occurrence).

The above-described solution is described only in the timing diagram for some example embodiments as illustrated in FIG. 9, but not in the timing diagram for some example embodiments as illustrated in FIG. 8. However, likewise as illustrated in FIG. 8, if falling edge A' is input within a set period after rising edge C' is input, the PMIC may not output the voltage control signals vout1, vout2 and vout3 as shown in association with the part marked B', but instead may disregard the falling edge A'.

Figure 10:
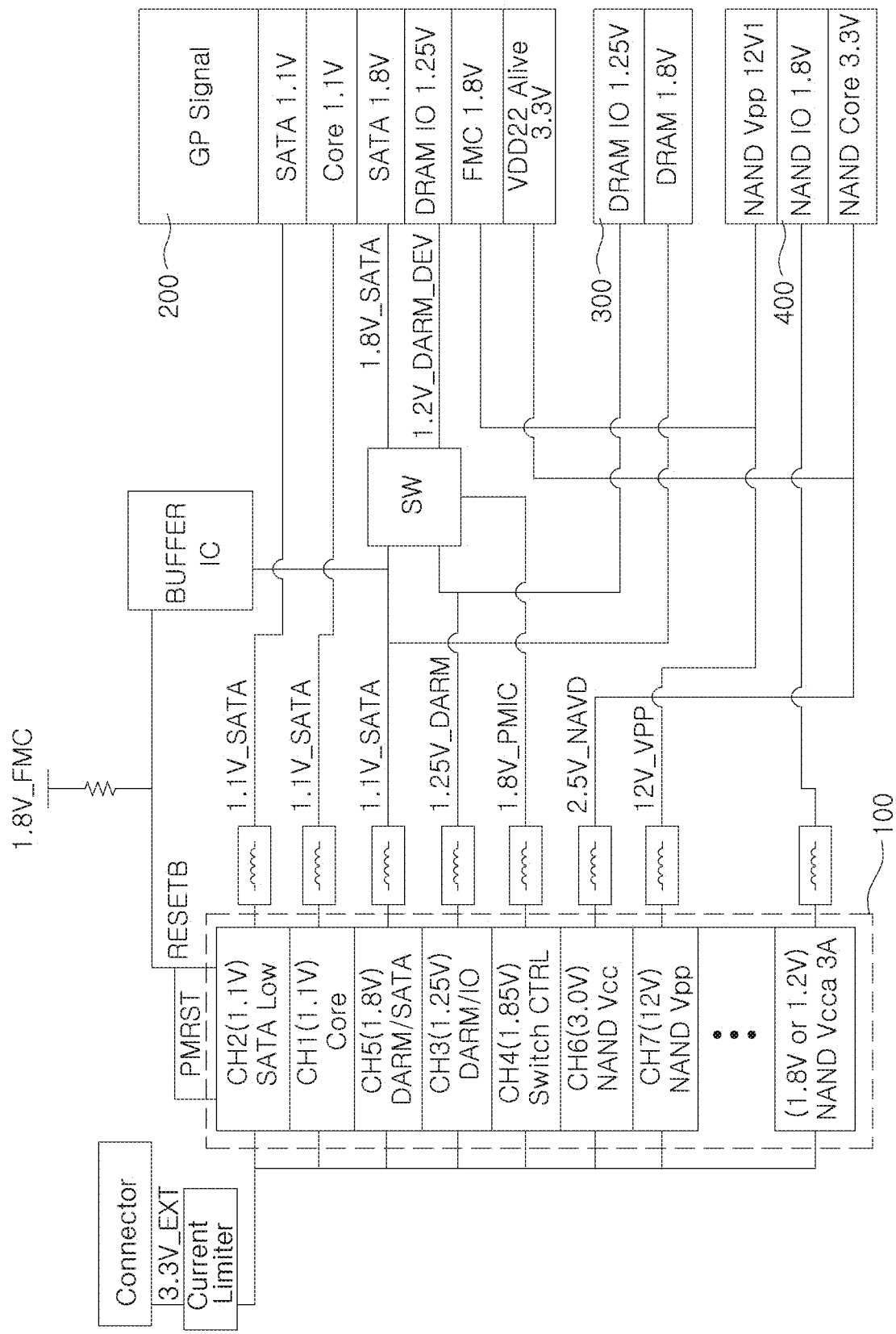
FIG. 10 is a block diagram illustrating a SSD according to some example embodiments.

FIG. 10 is a block diagram illustrating a SSD according to some example embodiments.

Referring to FIG. 10, an SSD according to some example embodiment may include a controller 200 for controlling an operation of the SSD, a volatile memory 300 temporarily storing data, a non-volatile memory 400 for receiving and storing the data stored in the volatile memory unit, and a power management integrated circuit 100.

The power management integrated circuit 100 may control power supplied to the controller 200, the volatile memory 300, and the non-volatile memory 400. In addition, the power management integrated circuit 100 may include an active register for storing active mode control data required when the SSD is switched from a low power mode to an active mode, and a standby register for storing low power mode control data required when the SSD is switched from the active mode to the low power mode.

As illustrated in FIG. 10, a power management integrated circuit 100 (also referred to as the PMIC herein) according to some example embodiments may include a plurality of channels through which power control signals may be output (e.g., by the PMIC chip) for controlling power, an active register for storing active mode control data used for switching the SSD from the low power mode to the active mode, and/or a standby register for storing low power mode control data used for switching the SSD from the active mode to the low power mode.

The power management integrated circuit 100 may output a plurality of power control signals for controlling the power of the SSD through a plurality of channels CH1 to CHN. For example, the power management integrated circuit 100 may output a 1.1V_SATA signal to an SATA interface of the controller 200 through a second channel CH2. The power management integrated circuit 100 may output a 1.1V_CORE signal to a core chip of the controller 200 through a first channel CH1. The power management integrated circuit 100 may output a 1.8V_DRAM signal to a switch SW through a fifth channel. The power management integrated circuit 100 may output a 1.25V_DRAM signal to the switch SW through a third channel. The power management integrated circuit 100 may output a 1.8V_PMIC signal to the switch SW through a fourth channel. In this case, the switch SW may perform a switching operation under control of the 1.8V_PMIC signal, to output the 1.8V_SATA signal to the SATA interface of the controller 200, or output a 1.2V_DRAM_DEV signal to a DRAM input/output device of the controller 200. The power management integrated circuit 100 may apply a 2.5V_NAND signal to a DC power terminal of the controller 200 through the sixth channel CH6, or output the 2.5V_NAND signal to a core chip of the non-volatile memory 400. The power management integrated circuit 100 may apply a 12V_VPP signal to the DC power terminal of the non-volatile memory 400 through a seventh channel CH7. Also, the power management integrated circuit 100 may output a 1.8V_NAND signal or a 1.2V_NAND signal to an FMC module of the controller 200 or a NAND input/output device of the non-volatile memory 400 through at least one channel among the other channels CH8 to CHN under control of the 1.8V_PMIC signal. An example waveform of the various signals described with reference to FIG. 10 is as illustrated in FIG. 2.

The SSD illustrated in FIG. 10 is depicted as having eight channels as the plurality of channels through which may be output the power control signals for controlling power of the SSD. Among the eight channels, three channels may be used to control a controller 200, two channels may be used to control a volatile memory unit 300, and the remaining three channels may be used to control output of a non-volatile memory unit 400. However, the total number of channels, and the number of channels used for controlling respective components, may be varied according to some example embodiments.

Also, since description for the active register, the standby register, and/or the active mode control data and/or the low power mode control data stored in these registers, and/or specific control data contained in the active mode control data and/or the low power mode control data, is already described with reference to FIG. 5 to FIG. 9, and/or in relevant parts of the specification, description of these elements will not be given here to avoid redundancy. Further, since in the case in which the select signal is input to one or two of select signal receiving pins, the extent to which specific control data may be used in such cases in a mode switching process may be understood through the previously given description, a further description will not be given.

Also, a SSD according to some example embodiments may include at least one controller 200 that may control one or more operations of the SSD, a volatile memory unit 300 that may temporarily store data, a non-volatile memory unit 400 that may receive and/or store the data stored in the volatile memory unit, and/or a power management integrated circuit (PMIC) unit 100.

The PMIC unit 100 may control power supplied (e.g., control the timing and voltage level of power supply) to the controller 200, the volatile memory unit 300, and/or the non-volatile memory unit 400. Also, the PMIC unit 100 may include an active register that may store active mode control data used for switching the SSD from the low power mode to the active mode; and/or a standby register that may store low power mode control data used for switching the SSD from the active mode to the low power mode. According to some example embodiments, operations described herein as being performed by the PMIC 100 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The description of the active register, the standby register, and/or the active mode control data and/or the low power mode control data stored in these registers, and/or specific control data contained in these active mode control data and/or low power mode control data, and/or particulars of power control by the PMIC 100, are previously provided with reference to FIG. 3 to FIG. 7 and/or in relevant parts of the specification, further descriptions will not be provided to avoid redundancy.

The term "unit", that is, "module" or "table" as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors (e.g., processing circuitry). Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Furthermore, components and modules may be configured to play one or more CPUs within a device.

As discussed above, the use of SSDs provides advantages over conventional hard disk drives, such as reduced operating noise and power consumption. However, SSDs are vulnerable to various types of errors when incorporated into computers that switch between an active mode and a low power mode. For example, a non-volatile memory of the SSD may experience a memory initialization failure when the SSD receives a second signal indicating a switch from the low power mode to the active mode within a short period of time after receiving a first signal indicating a switch from the active mode to the low power mode. In particular, if the second signal is received before the non-volatile memory has been completely discharged, the non-volatile memory may experience a memory initialization failure.

Also, the non-volatile memory may experience an error if an abnormal control signal occurs while the non-volatile memory and a controller of the SSD are in the process of discharging responsive to receiving a signal indicating a switch from the active mode to the low power mode. Such an error may be prevented and/or reduced by only powering off the controller once the non-volatile memory has completely discharged. In conventional devices and methods, signals used to discharge the controller and non-volatile memory are received by the PMIC from an external source. However, conventional devices and methods for controlling the power provided to the non-volatile memory and controller are unable to determine and/or control the timing at which the non-volatile memory and controller are discharged and/or charged with sufficient precision to prevent and/or reduce this error (e.g., due to delay in receiving the signals from the external source, and SSD-specific parameters). For example, the falling slew rate of a voltage level (e.g., power discharge rate) of the non-volatile memory and controller differ according to the particular type of SSD and are unknown to the computer (e.g., the external source may be at least one processor of the computer) that provides the signal indicating the switch from the active mode to the low power mode.

However, according to some example embodiments, improved PMICs and methods are provided that control the power supplied to an SSD according to low power mode control data and/or active mode control data specific to the particular type of SSD being controlled with reduced delay (e.g., with greater precision). Accordingly, errors resulting from the abnormal control signals experienced by the conventional devices and methods as discussed above, are prevented and/or reduced by the improved PMICs and methods by only powering off the controller once the non-volatile memory has completely discharged based on the low power mode control data and/or active mode control data. Also, the improved methods and PMICs control the power supplied to the SSD by disregarding a second signal indicating a switch to the active mode in response to determining that the second signal was received within a determined period after a first signal indicating a switch to the low power mode. Accordingly, the improved PMICs and methods prevent and/or reduce the memory initialization failures experienced by the conventional devices and methods.

By using PMIC chips, SSDs including the same, and/or SSD power-mode control methods according to some example embodiments, control signals for supplying and/or blocking (e.g., disconnecting) power to components constituting a SSD may be performed on the basis of an appropriate order and/or timing to thereby prevent and/or reduce errors that may occur during a process of switching between an active mode and a low power mode.

Some example embodiments of the present disclosure have been described above. Of course, it will be apparent to those skilled in the art that modifications and variations on some example embodiments could be made without departing from the scope of the appended claims. Accordingly, it should be understood that the present disclosure includes all modifications and equivalents of the subject matter recited in the claims appended hereto.

What is claimed is:

1. A solid-state drive (SSD) power-mode control method comprising:
   storing, in an active register, active mode control data used for switching the SSD from a low power mode to an active mode;
   storing, in a standby register, low power mode control data used for switching the SSD from the active mode to the low power mode;
   receiving a first select signal and a second select signal through at least one pin;
   controlling power supplied to the SSD in accordance with the low power mode control data or the active mode control data in response to the SSD switching (i) from the active mode to the low power mode based on the second select signal or (ii) from the low power mode to the active mode based on the first select signal; and
   disregarding the second select signal in response to the second select signal being received within a time period after the first select signal is received.

2. The SSD power-mode control method of claim 1, wherein the active mode control data includes at least one among:
   first enable control data for controlling an on or off state of a channel;
   first discharge control data for controlling a discharge rate of a control target;
   first pulse control data for controlling a shape of a power pulse supplied by the channel; or
   first voltage level control data for modulating a level of a voltage supplied by the channel.

3. The SSD power-mode control method of claim 1, wherein the low power mode control data includes at least one among:
   second enable control data for controlling an on or off state of a channel;
   second discharge control data for controlling a discharge rate of a control target;
   second pulse control data for controlling a shape of a power pulse supplied by the channel; or
   second voltage level control data for modulating a level of a voltage supplied by the channel.

4. The SSD power-mode control method of claim 3, wherein the low power mode control data further includes delay control data for controlling a timing of outputting a control signal through the channel.

5. The SSD power-mode control method of claim 4, wherein
   the delay control data includes at least two delay values; and
   the controlling includes outputting a plurality of power control signals over a plurality of different channels, each of the plurality of power control signals being output at a different time in accordance with the low power mode control data.

6. The SSD power-mode control method of claim 1, wherein the active register and the standby register are separate internal operation registers of a power management integrated circuit (PMIC) chip included in the SSD.

7. The SSD power-mode control method of claim 6, wherein the receiving receives the first select signal and the second select signal from an external source, the first select signal or the second select signal being used to determine an output in accordance with the active mode control data or the low power mode control data.

8. The SSD power-mode control method of claim 7, wherein
the at least one pin includes a select signal receiving pin of the PMIC chip;
the controlling includes outputting, by the PMIC chip, one or more power control signals in accordance with the active mode control data in response to detecting the first select signal at the select signal receiving pin, the first select signal switching from logic Low to logic High; and
the controlling includes outputting, by the PMIC chip, the one or more power control signals in accordance with the low power mode control data in response to detecting the second select signal at the select signal receiving pin, the second select signal switching from logic High to logic Low.

9. The SSD power-mode control method of claim 7, wherein
the receiving receives the first select signal via a first select signal receiving pin of the PMIC chip and the second select signal via a second select signal receiving pin of the PMIC chip;
the controlling includes outputting, by the PMIC chip, one or more power control signals in accordance with the active mode control data in response to detecting the first select signal at the first select signal receiving pin; and
the controlling includes outputting, by the PMIC chip, the one or more power control signals in accordance with the low power mode control data in response to detecting the second select signal at the second select signal receiving pin.

10. The SSD power-mode control method of claim 8, further comprising:
receiving a third select signal from the external source; and
disregarding the third select signal in response to (i) the third select signal indicating that the SSD is switching from the active mode to the low power mode, (ii) the first select signal indicating that the SSD is switching from the low power mode to the active mode, and (iii) the third select signal being received within a period of time after the first select signal is received.

11. A power management integrated circuit (PMIC) chip comprising:
a plurality of channels;
at least one pin;
an active register configured to store active mode control data used for switching a solid-state drive (SSD) from a low power mode to an active mode;
a standby register configured to store low power mode control data used for switching the SSD from the active mode to the low power mode; and
processing circuitry configured to,
receive a first select signal and a second select signal through the at least one pin,
output a plurality of power control signals for controlling power of the SSD via the plurality of channels based on (i) the active mode control data or the low power mode control data, and (ii) the first select signal or the second select signal, and
disregard the second select signal in response to the second select signal being received within a time period after the first select signal is received.

12. The PMIC chip of claim 11, wherein the active mode control data includes at least one among:
first enable control data for controlling an on or off state of at least one channel among the plurality of channels;
first discharge control data for controlling a discharge rate of a control target;
first pulse control data for controlling a shape of a power pulse supplied by the at least one channel; or
first voltage level control data for modulating a level of a voltage supplied by the at least one channel.

13. The PMIC chip of claim 11, wherein the low power mode control data includes at least one among:
second enable control data for controlling an on or off state of at least one channel among the plurality of channels;
second discharge control data for controlling a discharge rate of a control target;
second pulse control data for controlling a shape of a power pulse supplied by the at least one channel; or
second voltage level control data for modulating a level of a voltage supplied by the at least one channel.

14. The PMIC chip of claim 13, wherein the low power mode control data further includes delay control data for controlling a timing of outputting a control signal through the at least one channel.

15. The PMIC chip of claim 14, wherein
the delay control data includes at least two delay values; and
the processing circuitry is configured to output each of the plurality of power control signals at a different time in accordance with the at least two delay values, each of the plurality of power control signals being output in accordance with the low power mode control data.

16. The PMIC chip of claim 11, wherein the processing circuitry is configured to:
receive the first select signal and the second select signal from an external source, the first select signal or the second select signal being used to determine an output in accordance with the active mode control data or the low power mode control data.

17. The PMIC chip of claim 16, wherein
the at least one pin includes a select signal receiving pin; and
the processing circuitry is configured to,
receive the first select signal and the second select signal via the select signal receiving pin,
output the plurality of power control signals in accordance with the active mode control data in response to detecting the first select signal at the select signal receiving pin, the first select signal switching from logic Low to logic High, and
output the plurality of power control signals in accordance with the low power mode control data in response to detecting the second select signal at the select signal receiving pin, the second select signal switching from logic High to logic Low.

18. The PMIC chip of claim 16, wherein
the at least one pin includes a first select signal receiving pin and a second select signal receiving pin; and
the processing circuitry is configured to,
receive the first select signal via the first select signal receiving pin,
receive the second select signal via the second select signal receiving pin,
output the plurality of power control signals in accordance with the active mode control data in response to detecting the first select signal at the first select signal receiving pin, and
output the plurality of power control signals in accordance with the low power mode control data in response to detecting the second select signal at the second select signal receiving pin.

19. The PMIC chip of claim 17, wherein the processing circuitry is configured to:
  receive a third select signal from the external source; and
  disregard the third select signal in response to (i) the third select signal indicating that the SSD is switching from the active mode to the low power mode, (ii) the first select signal indicating that the SSD is switching from the low power mode to the active mode, and (iii) the third select signal being received within a period of time after the first select signal is received.

20. A solid-state drive (SSD) comprising:
  a controller;
  a volatile memory configured to store operating data;
  a non-volatile memory configured to,
    receive the operating data from the volatile memory, and
    store the operating data; and
  a power management integrated circuit (PMIC) including an active register, a standby register, processing circuitry and at least one pin, the active register configured to store active mode control data used for first switching the SSD from a low power mode to an active mode, the standby register configured to store low power mode control data used for second switching the SSD from the low power mode to the active mode, the processing circuitry configured to,
    receive a first select signal and a second select signal through the at least one pin,
    perform the first switching or the second switching based on the first select signal or the second select signal, and
    disregard the second select signal in response to the second select signal being received within a time period after the first select signal is received.

* * * * *